United States Patent [19]

Owens

[11] Patent Number: 5,057,554
[45] Date of Patent: Oct. 15, 1991

[54] ADDITIVES FOR ENHANCED DIELECTRIC CURING

[75] Inventor: John N. Owens, Sterling Heights, Mich.

[73] Assignee: General Motors Corporation, Detroit, Mich.

[21] Appl. No.: 430,046

[22] Filed: Nov. 1, 1989

[51] Int. Cl.$^5$ .............................................. C08K 5/17
[52] U.S. Cl. .................................... 523/300; 523/461; 524/236
[58] Field of Search ...................... 523/300, 461, 508; 524/236; 427/45.1

[56] References Cited

U.S. PATENT DOCUMENTS

| | | | |
|---|---|---|---|
| 2,593,787 | 4/1952 | Parker | 523/508 |
| 3,790,522 | 2/1974 | Bliss | 523/461 |
| 3,923,725 | 12/1975 | Kadotani et al. | 523/461 |
| 3,932,348 | 1/1976 | Camelon et al. | 523/461 |
| 4,284,753 | 8/1981 | Hewitt, Jr. | 528/89 |
| 4,358,577 | 11/1982 | McCrary et al. | 528/89 |
| 4,423,191 | 12/1983 | Haven et al. | 523/300 |
| 4,554,341 | 11/1985 | Allen | 528/89 |
| 4,725,652 | 2/1988 | Bertram et al. | 525/485 |

Primary Examiner—Lewis T. Jacobs
Assistant Examiner—Karen A. Hellender
Attorney, Agent, or Firm—R. W. Tung

[57] ABSTRACT

A heat curable resin composition consists essentially of a thermosetting resin, a curing agent chemically reacting with the resin for curing the resin upon the application of a predetermined amount of heat for a predetermined period of time, and a chemically inert salt which is soluble in the resin for increasing the dielectric loss factor of the composition without a significant increase in viscosity of the composition to accelerate the dielectric heating rate.

A method of preparing the heat curable resin composition includes the steps of mixing the thermosetting resin and curing agent which chemically reacts with the resin for curing the resin upon the application of a predetermined amount of heat for a predetermined period of time and dissolving a chemically inert salt in the resin and increasing the dielectric loss factor of the composition without a significant increase in viscosity of the composition. The composition is dielectrically heated at an accelerated rate which is faster than the rate of heating the mixture of the resin and curing agent alone.

4 Claims, 6 Drawing Sheets

ADDITIVES FOR ENHANCED DIELECTRIC CURING

TECHNICAL FIELD

The present invention relates to heat curable resin compositions. More specifically, the present invention relates to a composition and method for improving the curing of resin used in structural composites, such as epoxy resins by increasing the dielectric loss factor of the resin at radio frequencies.

BACKGROUND ART

Diamine curing agents are often favored as curatives for epoxy resins used in structural composites. J.N. Owens, "Dielectric Curing of Epoxy Resins: Measurements of Dielectric Properties at Radio Frequencies", G.M Research PO-844, June 4, 1987, the diamine curatives yield resin mixtures with low dielectric loss factors during the cure. On the other hand, processes are presently being employed utilizing a dielectric curing process for the fabrication of structural composites. The use of dielectric curing enables the rapid curing of thick cross sections and thereby reduces cycle times. With conventional heating, the thick cross sections are heated by conduction from the outside surfaces, whereas with dielectric heating, heat is generated within the entire volume of the part. The volumetric heating enables faster heating rates and shorter cure times. However, the low loss factors of the diamine cured epoxy resins make dielectric heating difficult. To take advantage of the dielectric heating process, a resin with high loss factor is desirable.

Although carbon blacks are known to increase the dielectric loss factor of epoxy resins, most carbon blacks cause a significant increase in resin viscosity, even at low concentrations Carbon blacks upwardly shift the entire loss factor curve of the resin but the shape of the curve is unaffected.

The present invention provides a chemically inert salt soluble in a resin for increasing the dielectric loss factor of the composition without significantly increasing the viscosity of the composition. Preferably, quaternary ammonium salts are used which have been unexpectedly found to increase the dielectric loss factor of epoxy resins. However, the salts are chemically inert in the resin.

The U.S. Pat. No. 4,554,341 to Allen, issued Nov. 19, 1985, discloses the addition of tetrabutylammonium bromide and similar salts for use as curing accelerator compound in an epoxy composition. The U.S. Pat. No. 4,358,577 to McCrary, issued Nov. 9, 1982, 4,284,753 to Hewitt, Jr., issued Aug. 18, 1981, and 4,725,652 to Bertram et al, issued Feb. 16, 1988, all disclose tetrabutylammonium salts for use as curing accelerators. In each of the aforementioned patents, the quaternary ammonium salt additives act as chemical accelerators to the curing reactions. The additives are not inert but rather are chemically active participants in the curing reaction The quaternary ammonium salts are not inert in the systems and there is absolutely no recognition of the quaternary ammonium salts having the ability to affect dielectric heating Moreover, none of the aforementioned patents utilize or contemplate the dielectric heating of the chemical compositions per se.

SUMMARY OF THE INVENTION

In accordance with the present invention there is provided a heat curable resin composition consisting essentially of a thermosetting resin, a curing agent chemically reacting with resin for curing the resin upon the application of a predetermined amount of heat for a predetermined period of time and a chemically inert salt soluble in the resin for increasing the dielectric loss factor of the composition without a significant increase in viscosity of the composition to accelerate the dielectric heating.

The present invention further provides a method of preparing a heat curable resin composition including the steps of mixing a thermosetting resin and a curing agent which chemically reacts with the resin for curing the resin upon the application of a predetermined amount of heat for a predetermined period of time and dissolving a chemically inert salt in the resin and increasing the dielectric loss factor of the composition without a significant increase in viscosity to the composition. The composition is dielectric heat cured at an accelerated rate which is faster than the rate of curing the mixture of the resin and curing agent alone.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

The present invention provides a heat curable resin composition consisting essentially of a thermosetting resin, a curing agent chemically acting with the resin for curing the resin upon the application of a predetermined amount of heat for a predetermined period of time, and a chemically inert salt which is soluble in the resin for increasing the dielectric loss factor of the composition without a significant increase in viscosity of the composition to accelerate the dielectric heating rate.

More specifically, the resin is chosen to be in combination with the present inventive composition based on several factors. The viscosity of the resin is critical.

However, it must be recognized that a maximum resin viscosity can be affected by temperature as well as other environmental and chemical factors. Although a resin might be too viscous at room temperature, warming the resin to 50 C. might drop the viscosity sufficiently for the additives to be effective. A preferred resin for use is diglycidyl ether of bisphenol A (DGEBA). Examples of DGEBA are Epon 825 (n=0) and Epon 828 (n=0.1-0.2).

Secondly, the particular curing agent utilized in the composition can affect the viscosity. Amine curing agents can be chosen that are relatively low viscosity liquids that lower the resin viscosity when they are added to the composition. Accordingly, although a resin might be too viscous alone, it might be of appropriate viscosity after the curing agent is added. In view of the above, the maximum recommended resin viscosity is 1000 centipoise. This viscosity corresponds to the resin system with a curing agent added and at a temperature from which the resin will be dielectrically heated. It has been found experimentally that for resins with higher viscosities, the increase in loss factor due to the additives was minimal.

Resins that already have a dielectric loss factor greater than 0.5 probably do not need any additives combined therewith because they are already lossy enough to heat quickly in a dielectric field. Most anhydride/epoxy resins fall into this category. An additional parameter is the dielectric frequency utilized. Because the dielectric heating rate is directly proportional to frequency, dielectric heating is generally limited to frequencies above 10 MHz. Preferably, and unless otherwise labeled, all dielectric data in support hereof was taken at 20 MHz, a frequency close to what will be used for various industrial applications.

Because all of the parameters involved in the dielectric loss factor are interdependent, concentration, viscosity, initial loss factor, frequency, etc. all are expected to affect the enhancement of the loss factor, and, therefore, no single factor can be isolated without taking into account the other factors.

Preferably, diamine curing agents are utilized. Specific examples of diamine curing agents are isophorone diamine (IPD) and 1, 2-diaminocyclohexane (DACH).

Figure 6:
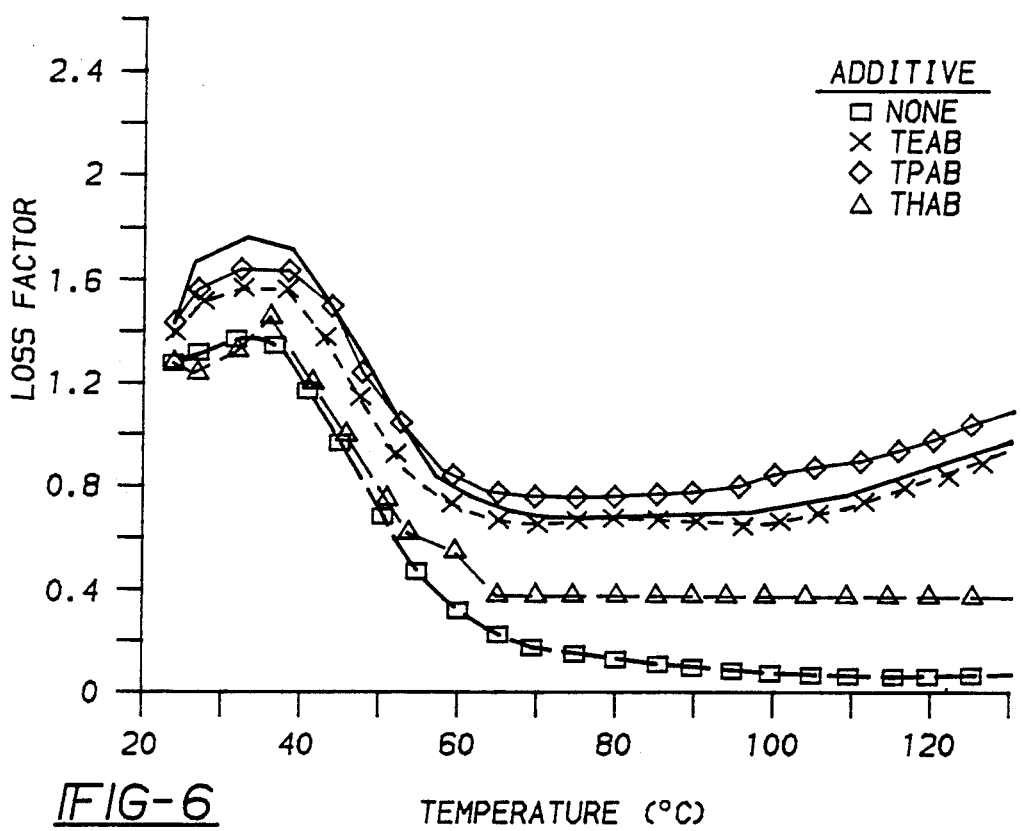
FIG. 6 is a graph of loss factor versus temperature for a series of quaternary ammonium salts with different cations.
Figure 7:
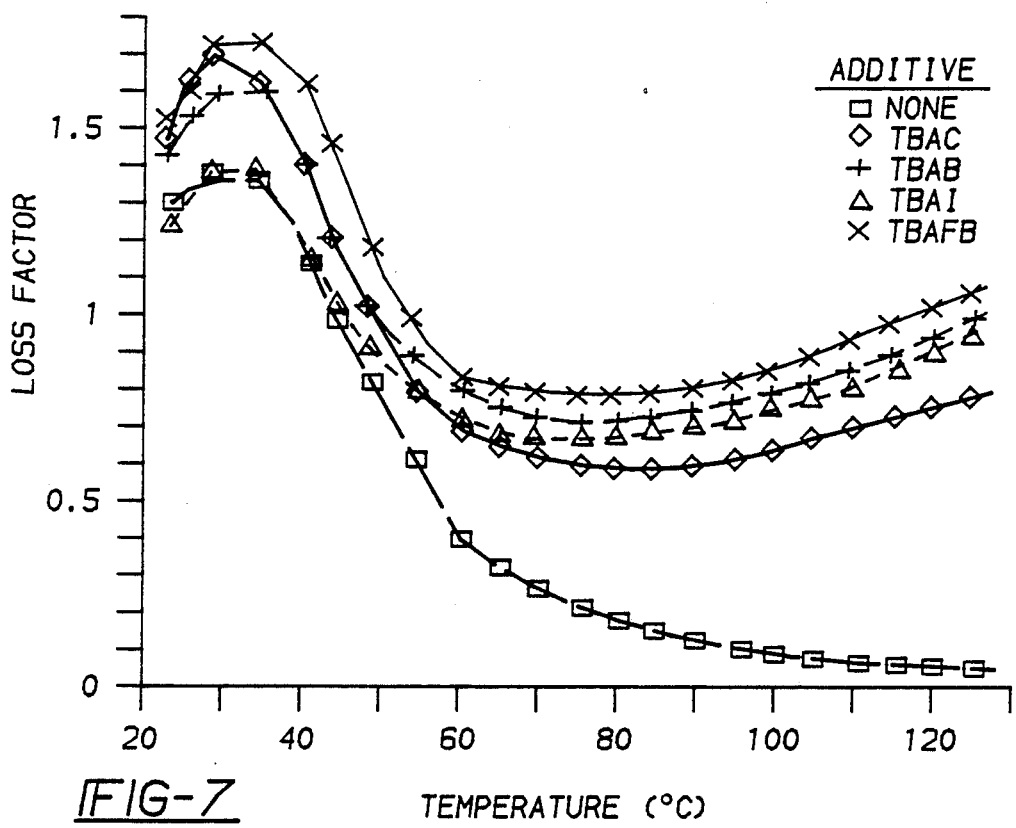
FIG. 7 is a graph of loss factor versus temperature for a series of quaternary ammonium salts with different anions.

Whereas the curing agent reacts chemically with the thermosetting resin to structurally alter the resin to a effect cure, the chemically inert salt additive chosen in accordance with the present invention is soluble in the resin but chemically inert. The salt additive increases the dielectric loss factor of the composition without a significant increase in viscosity of the composition thereby accelerating the dielectric heating rate. More specifically, dissolved quaternary ammonium salts were unexpectedly found to increase the dielectric loss factor of epoxy resins. As shown in FIG. 7, specific anionic quaternary ammonium salts that have been found to be effective are tetrabutylammonium tetrafluoroborate (TBAFB), tetrabutylammonium bromide (TBAB), tetrabutylammonium chloride and tetrabutylammonium iodide (TBAI). As shown in FIG. 6, specific cationic quaternary ammonium salts that have been found to be effective are tetraethylammonium bromide (TEAB), tetrapropylammonium bromide (TPAB), and tetrahexylammonium bromide. Other quaternary ammonium (TBA) salts are expected to behave similarly.

The preferred concentration range of the quaternary ammonium salts is 0.01 to 0.10 moles/liter. Higher concentrations are expected to provide additional gains in loss factor, but for dielectric heating applications, this gain is presently unnecessary.

The present invention further provides a method of preparing a heat curable resin composition including the steps of mixing the thermosetting resin and curing agent which chemically reacts with the resin for curing the resin upon the application of a predetermined amount of heat for a predetermined period of time. The chemically inert salt is dissolved in the resin and increases the dielectric loss factor of the composition without significantly increasing the viscosity of the composition. The composition is then dielectrically heat cured at an accelerated rate which is faster than the rate of curing the mixture of the resin and curing agent alone. Critical to the method is the dissolution of the chemically inert salt in the resin in combination with the salt being chemically inert except to the extent that it increases the dielectric loss factor of the composition.

More specifically, relatively low concentrations of TBA salts are dissolved in epoxy resins for the purpose of increasing the resin's dielectric loss factor at radio frequencies. This method facilitates the dielectric curing process for the epoxy resins with amine-based curing agents. Without the TBA salt, amine-cured epoxies have low dielectric loss factors at temperatures between 50° and 100° C. With the TBA salt, amine cured epoxies can be heated rapidly in dielectric molds.

To demonstrate the effect of TBA salts on the loss factor of resins, a 0.5% solution (by weight) of TBAB in diglycidyl ether of bisphenol A (DGEBA) was prepared and dielectric loss factors as a function of temperature and frequency were measured. The results of the experiment are shown in FIG. 1. These loss factors are compared to those for DGEBA resin without any additives. The graphs in FIG. 1 show that at temperatures between 50° and 100° C., the loss factors are increased significantly by the addition of TBAB. The graphs further show that the effect is seen at dielectric frequencies of between 10 MHz and 50 MHz.

Figure 1A:
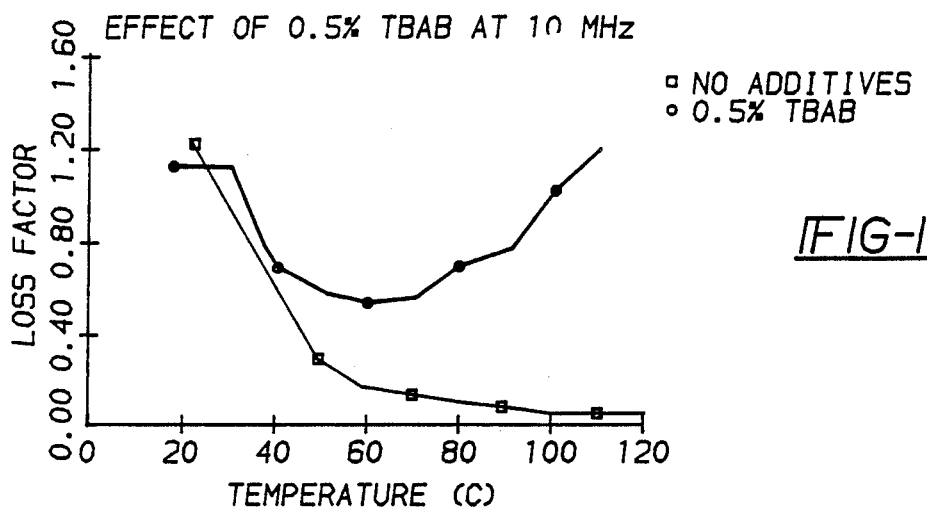
FIG. 1 is a compilation of graphs showing loss factors versus temperature of a diglycidyl ether of bisphenol A (DGEBA) resin with and without additives.
Figure 1B:
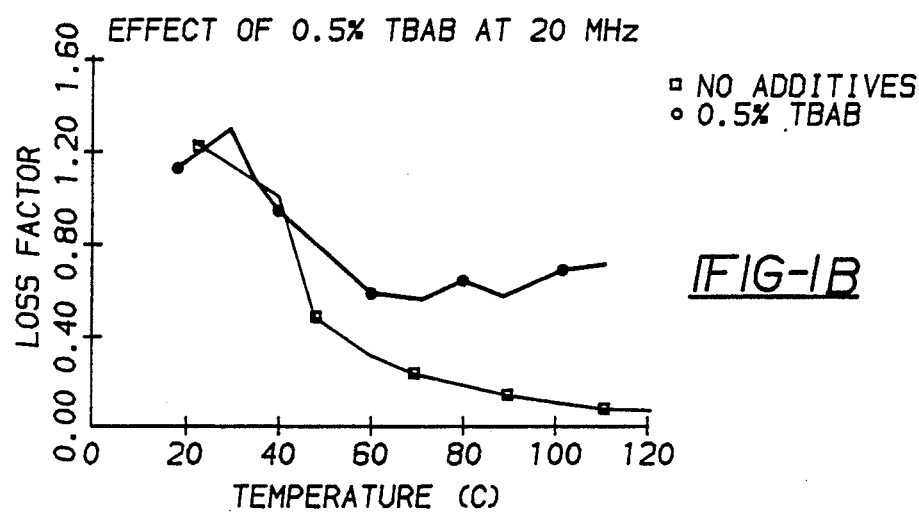
Figure 1C:
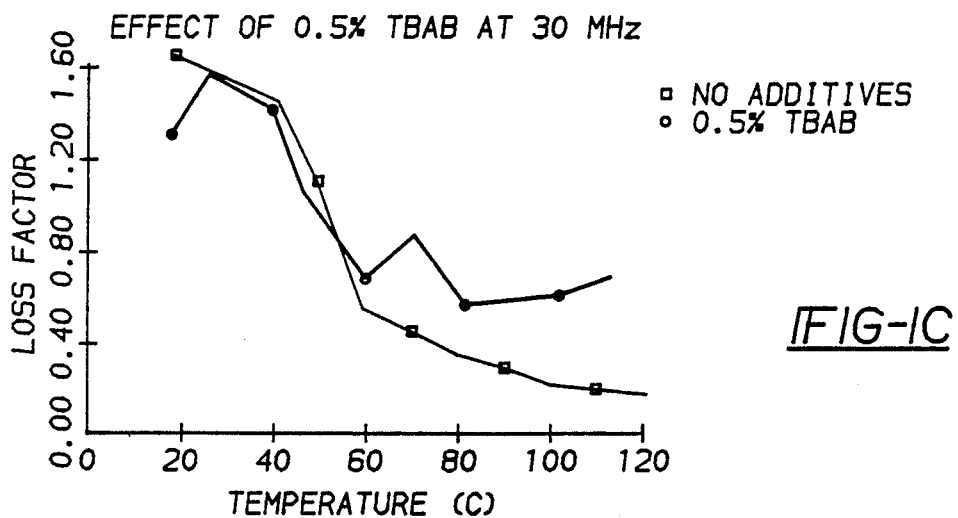
Figure 1D:
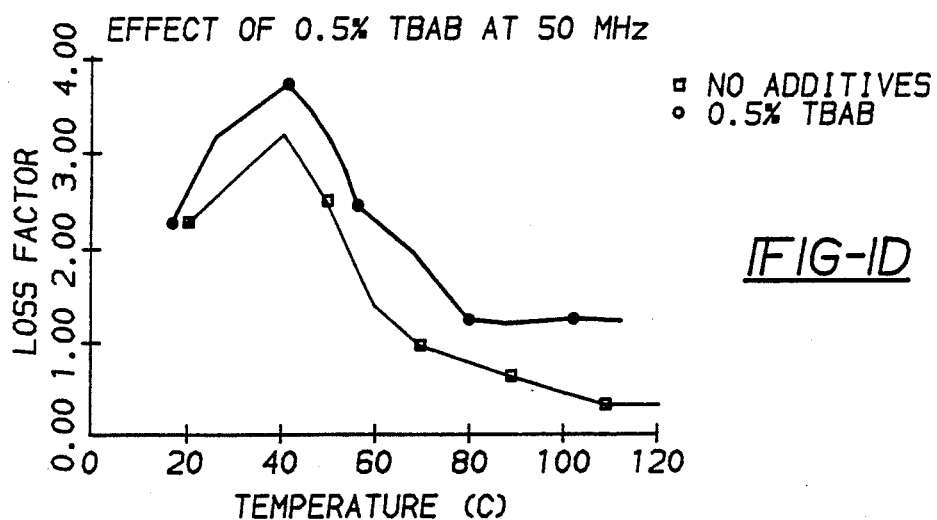
Figure 2A:
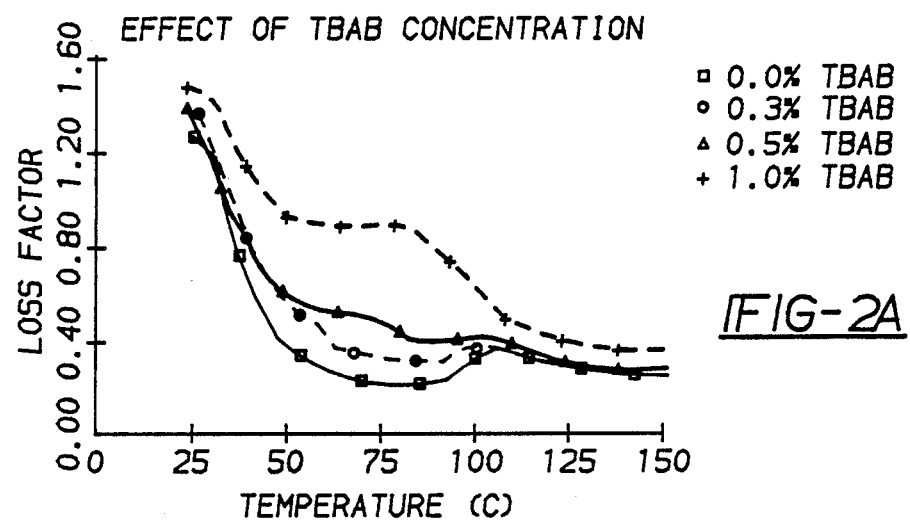
FIG. 2 is a compilation of graphs of loss factor curves for a DGEBA resin with curing agent with and without additives.
Figure 2B:
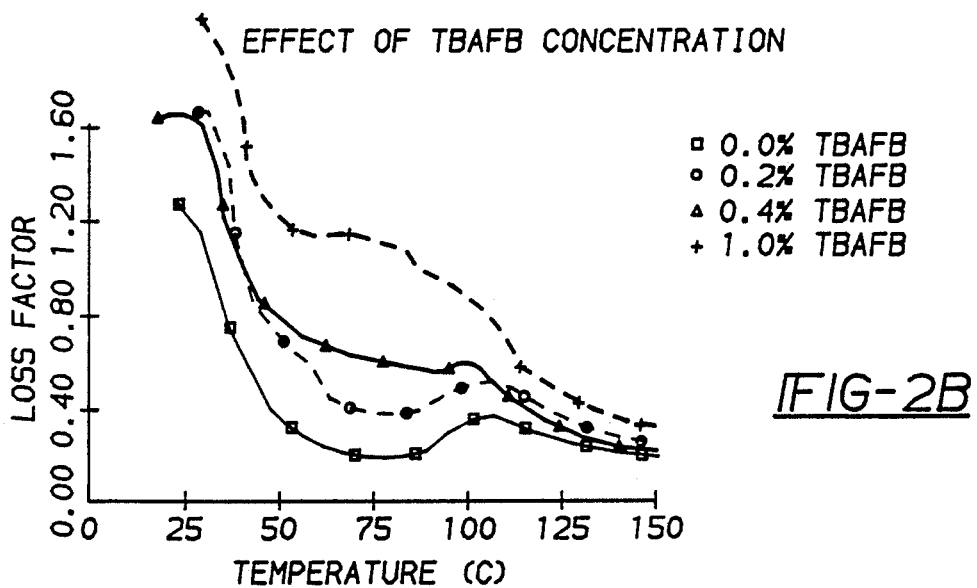
Figure 3:
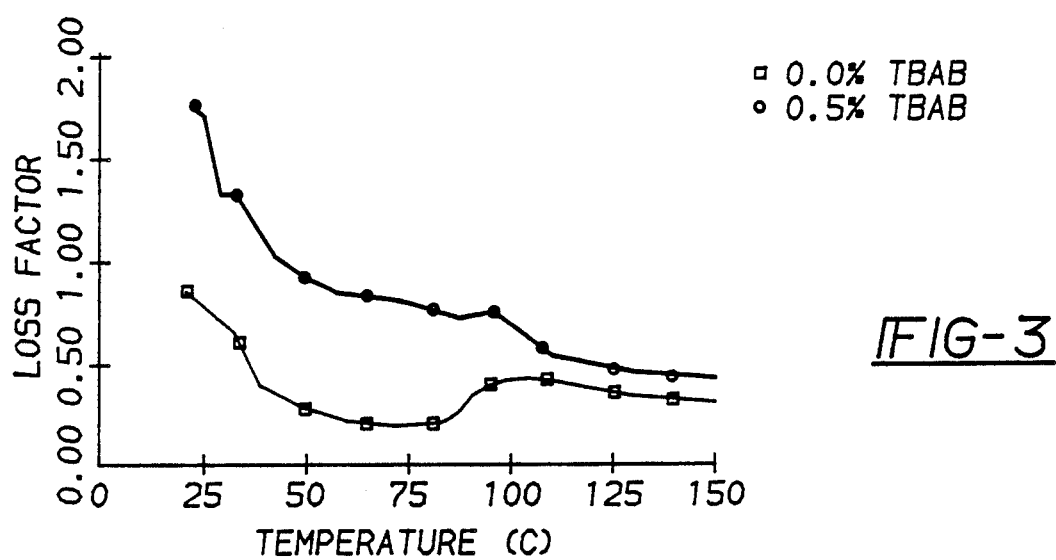
FIG. 3 is a graph of loss factor versus temperature for 1, 2-diaminocyclohexane cured resin with and without the additives.
Figure 4A:
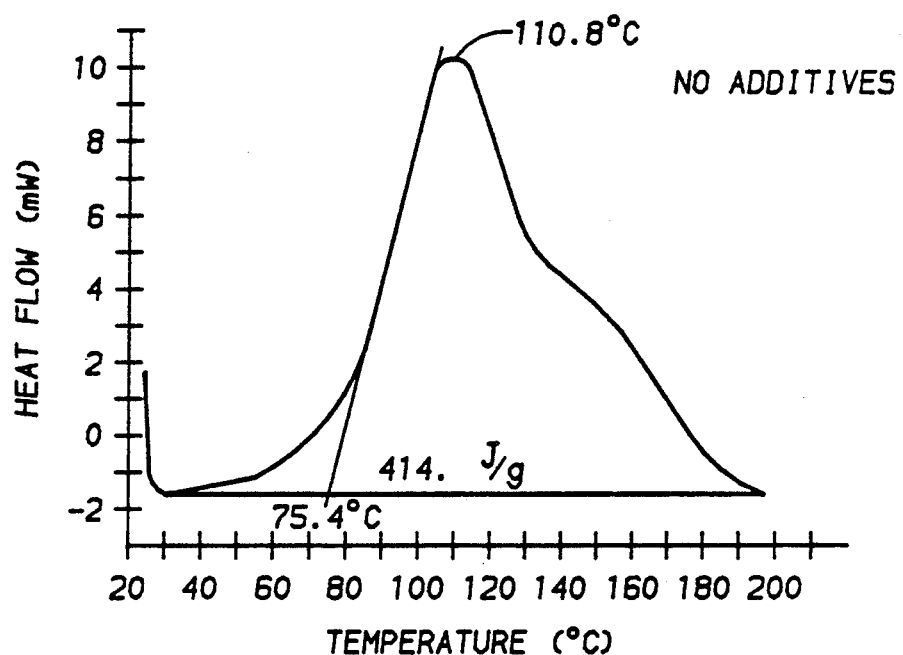
FIG. 4 shows two graphs of reaction exotherms for the temperature-ramp cure of a DGEBA resin with curing agent both with and without 1% tetrabutylammonium tetrafluoroborate.
Figure 4B:
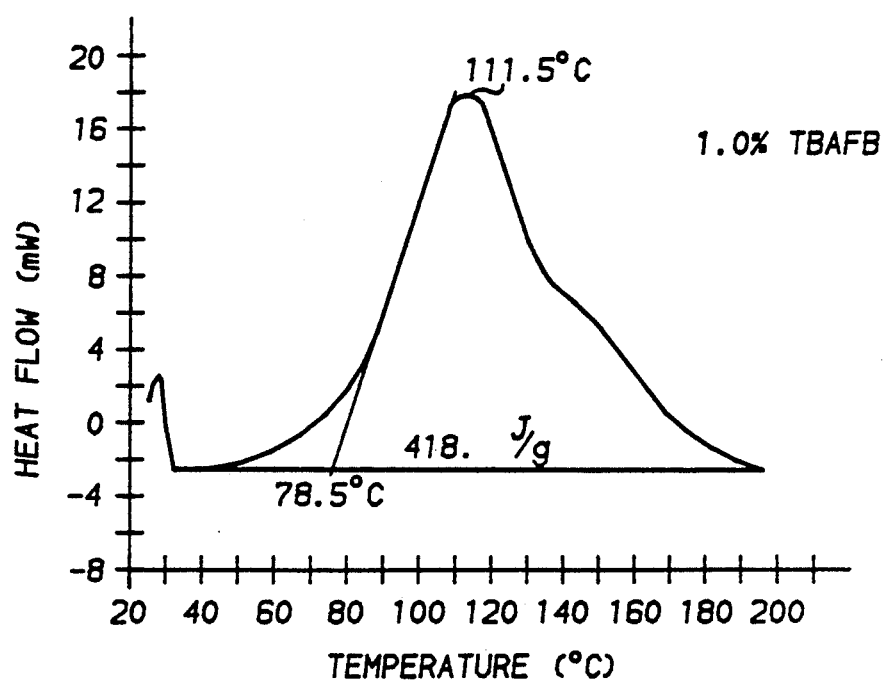

Measurements of dielectric loss factors of curing resin systems were also made both with and without TBA salt additives. In FIG. 2, loss factor curves are presented as a function of TBA salt concentration ranges from 0% to 1% for IPD cured DGEBA resin. A 5° C./minute temperature-ramp profile was used to cure the resin systems and loss factors measured at 20 MHz were recorded at 1 minute intervals. As shown in FIG. 2, both TBAB and TBAFB additives result in similar loss factor curves. A similar result was also obtained using DACH as the curing agent as shown in FIG. 3. Accordingly, the effects are seen to be additive for increasing concentrations of various TBA salts and the effect is also seen utilizing various curing agents.

Review of the results in FIGS. 1-4 shows that without the TBA additives, the dielectric loss factor versus temperature profile for the amine/epoxy system has a roller-coaster shape. This results in practical difficulties in designing a dielectric generator that can follow the rapidly changing loss factor of the resin. With the TBA additives the loss factor profile can be flattened significantly, thereby simplifying the dielectric generator design.

Figure 5A:
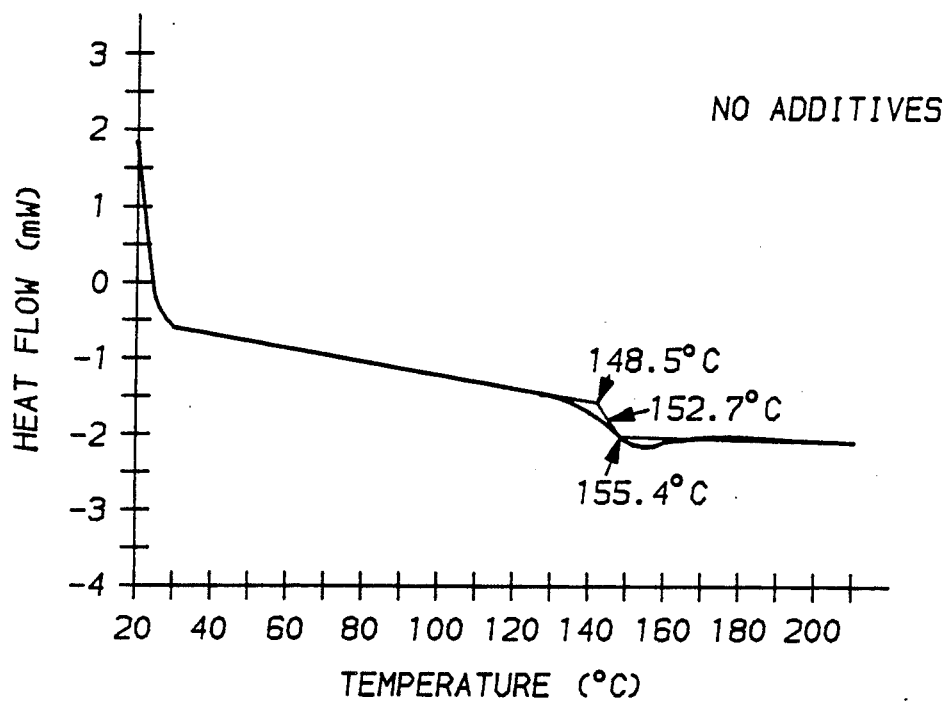
FIG. 5 is a graph showing the transition temperatures of cured DGEBA resin both with and without additives.
Figure 5B:
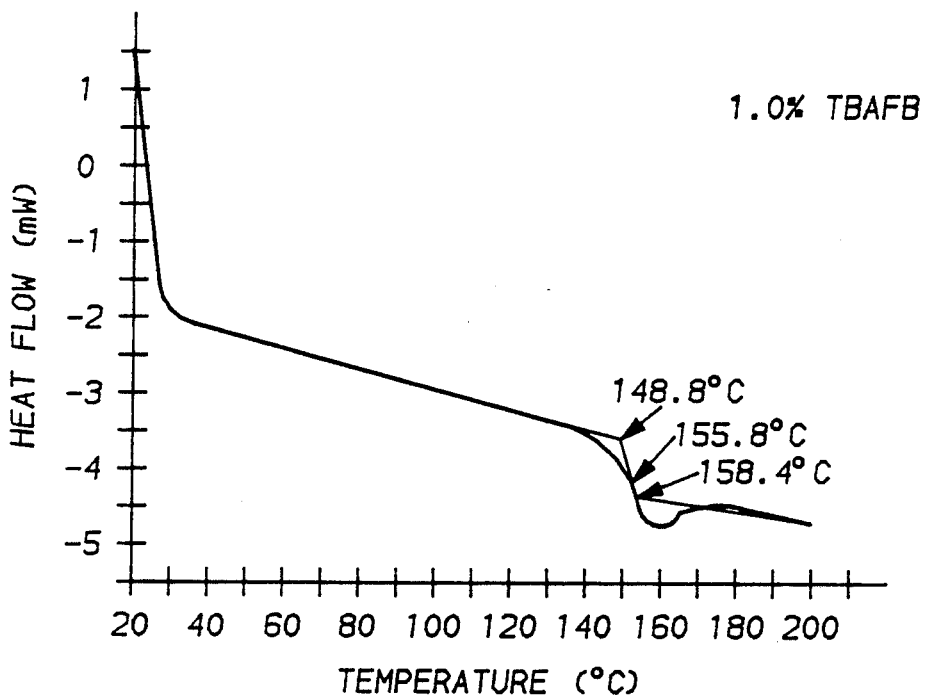

Although the TBA salt additives are used to increase the dielectric loss factor of the resin system, it is important that the additives do not adversely effect the cure kinetics and glass transition temperature (Tg). Thermal analysis techniques have been used to demonstrate that the addition of 1% of TBAFB, TBAI, or TBAB does not effect the kinetics or the Tg of DGEBA when cured with IPD. Reaction exotherms for the temperature-ramp cure both with and without 1% TBAFB are seen to be identical in FIG. 4. Similar results are obtained for both TBAB and TBAI. This data further demonstrates that the salt additives are inert chemically because the 1% TBAFB significantly effects the loss factor as shown in the previously discussed data and does not at all effect the relationship of heat flow to temperature. In addition, the Tg's of the cured resins were unaffected by the addition of the TBA salts as evidenced by the differential scanning calorimetry results in FIG. 5. These results suggest that the additives are not reacting with the epoxy or amine curatives and, therefore, should not cause any reduction of mechanical properties in the cured product.

As discussed above, carbon blacks are also known to increase the dielectric loss factor of epoxy resins although the present data shows that TBA salts have several advantages. First, the TBA salts are soluble in the epoxy resin and therefore result in minimal changes in resin viscosity whereas most carbon blacks cause a significant increase in resin viscosity, even at low concentrations Secondly, with TBA salts, the loss factor profile during heating is flatter as discussed above because of an apparent viscosity dependence. Utilizing carbon black, the entire loss factor curve is shifted upwards, but the shape is unaffected. Finally, utilizing TBA salts, the loss factor curve drops to low values near the end of the curve, thereby reducing the heating rate. This feature should help prevent overheating and make the dielectric heating process easier to control.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method of preparing a heat curable resin composition including the steps of: mixing an epoxy resin and a curing agent which chemically reacts with the resin for curing the resin upon the application of a predetermined amount of heat for a predetermined period of time; dissolving quaternary ammonium salt in the resin and increasing the dielectric loss factor of the composition without a significant increase in viscosity of the composition; and dielectric heat curing the composition oat an accelerated rate which is faster than the rate of curing the mixture of the resin and curing agent alone.

2. A method as set forth in claim 1 wherein said dissolving step is further defined as dissolving 0.01 to 0.10 moles/l of the quaternary ammonium salt in the mixture.

3. A method as set forth in claim 1 wherein said step of dielectric heat curing the composition is further defined as applying a dielectric field with a frequency of greater than 10 MHz.

4. A method as set forth in claim 8 further including the step of reducing the viscosity of the mixture below 1000 cp prior to said step of dielectric heat curing.

* * * * *